Nov. 7, 1961 H. E. FORESTER ET AL 3,007,390
EXPOSURE DEVICE
Filed May 22, 1959 9 Sheets-Sheet 7
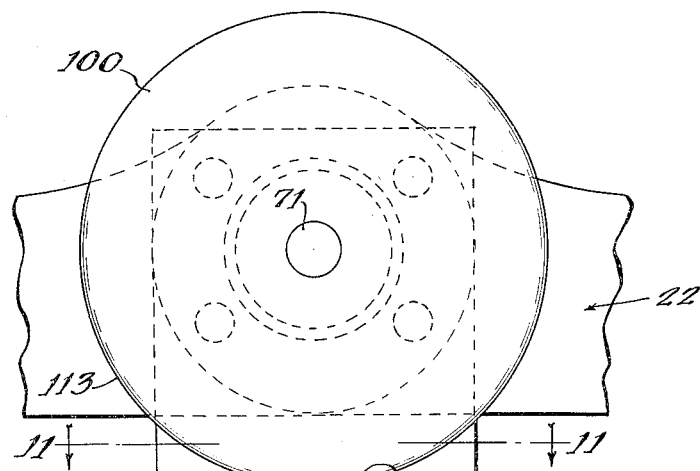
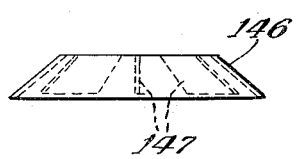
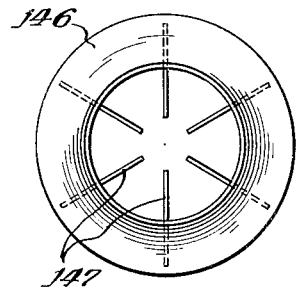
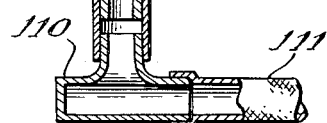
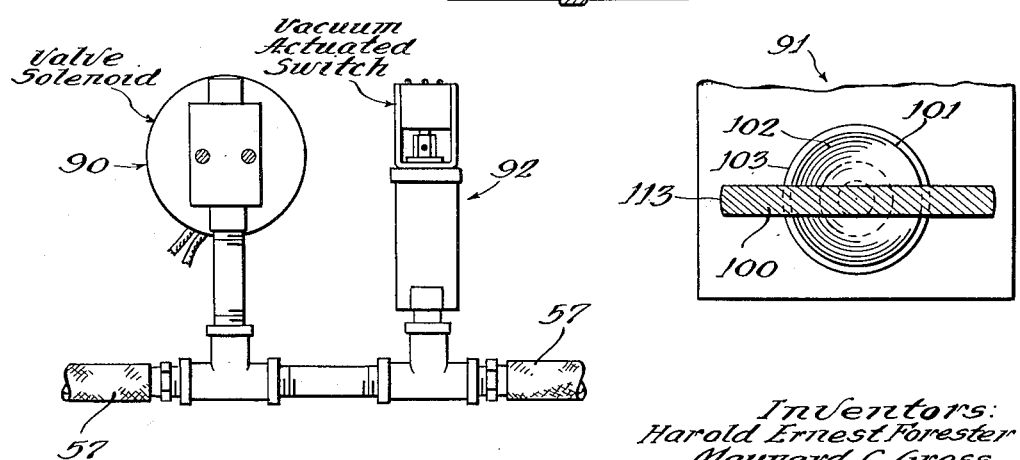
Inventors:
Harold Ernest Forester
Maynard C. Gross
By: Zabel, Baker, York,
Jones & Dithmar
Attorneys

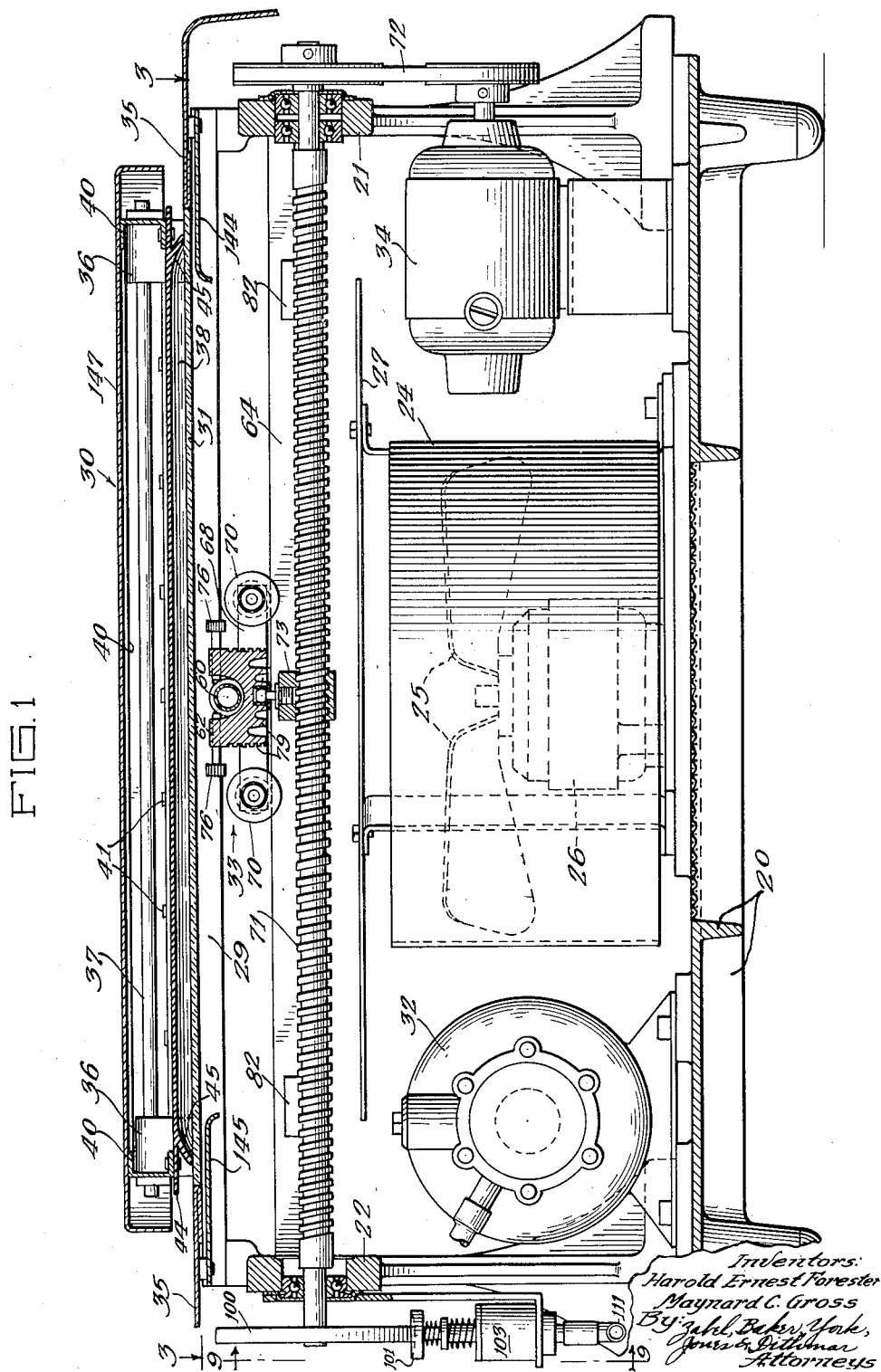

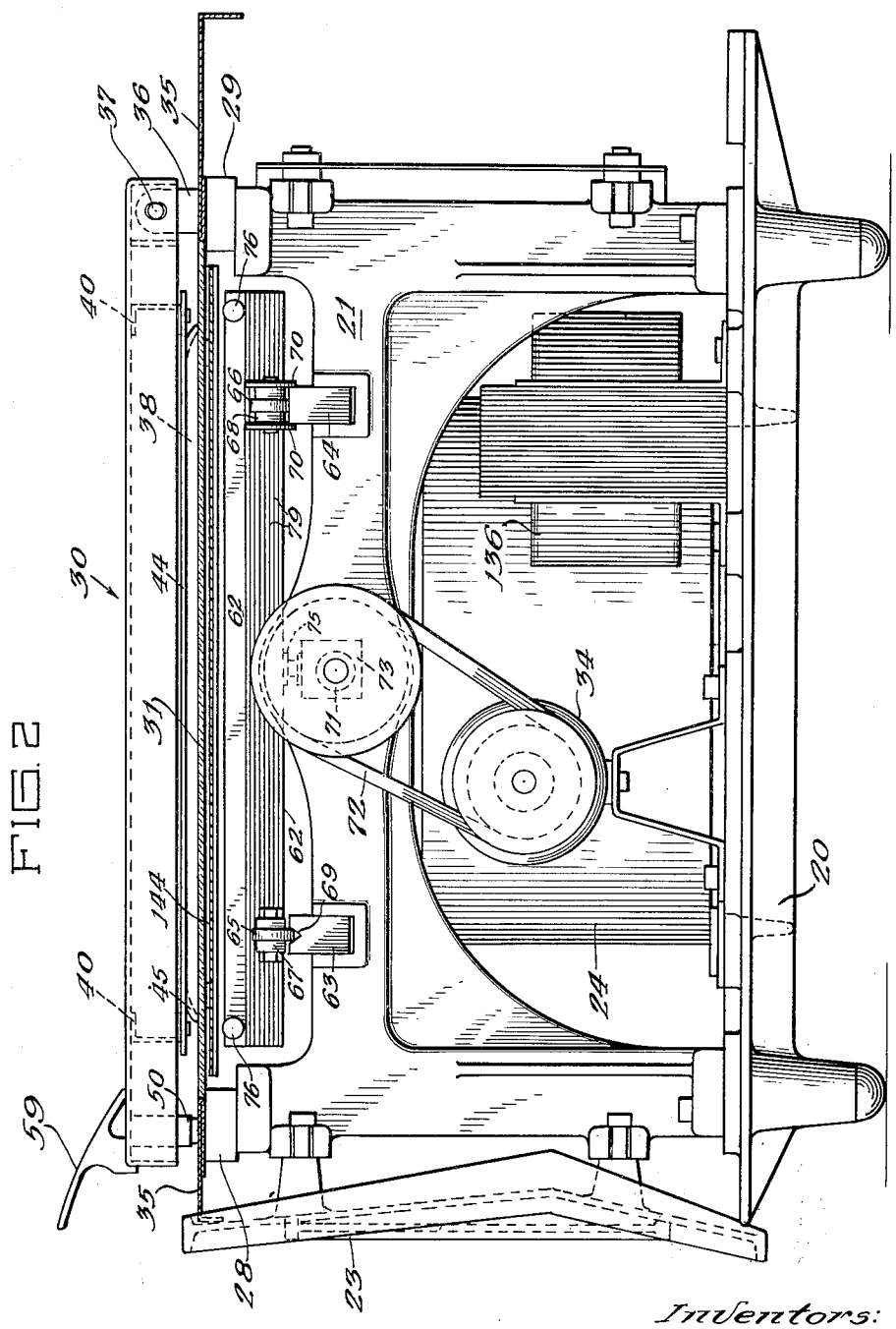

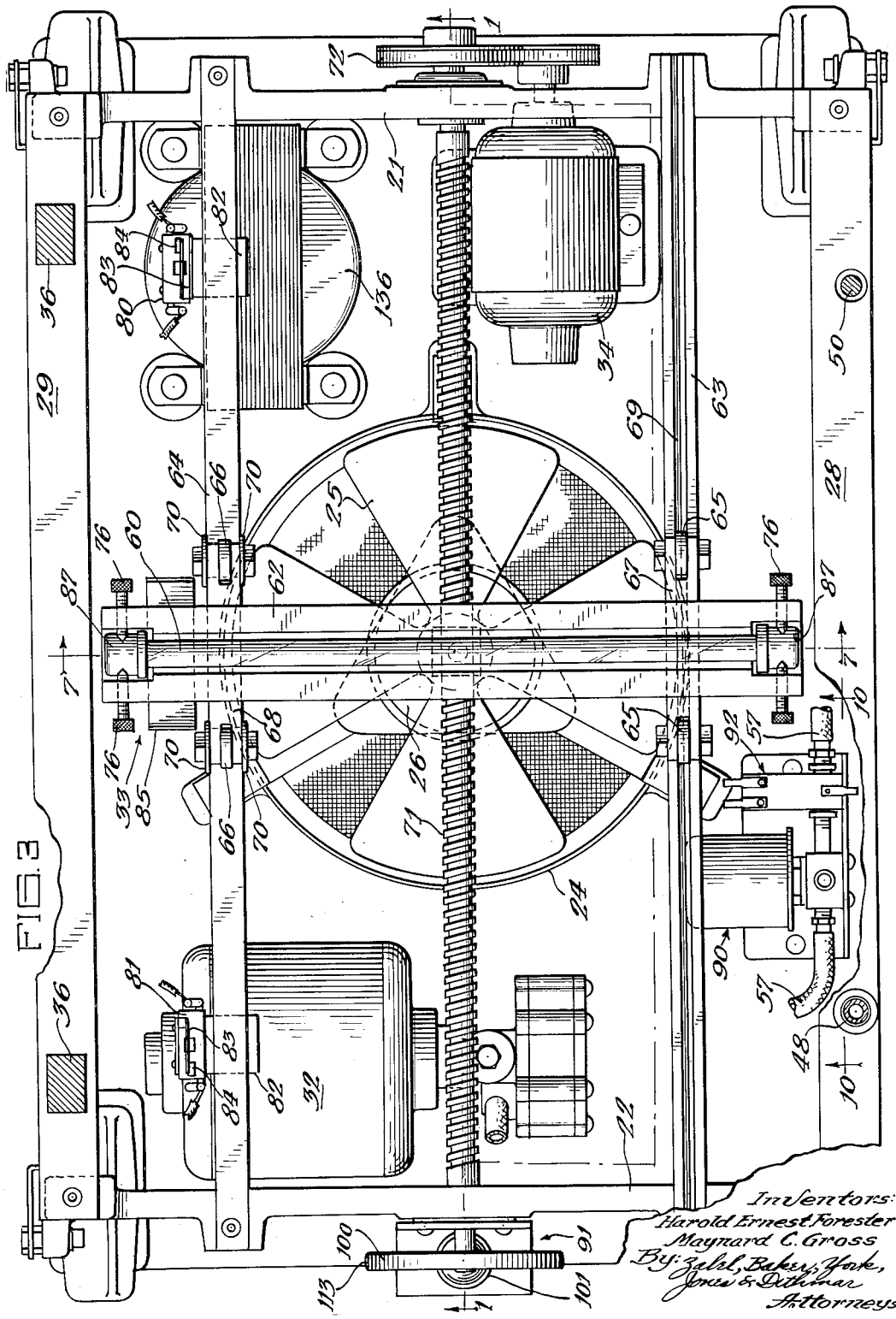

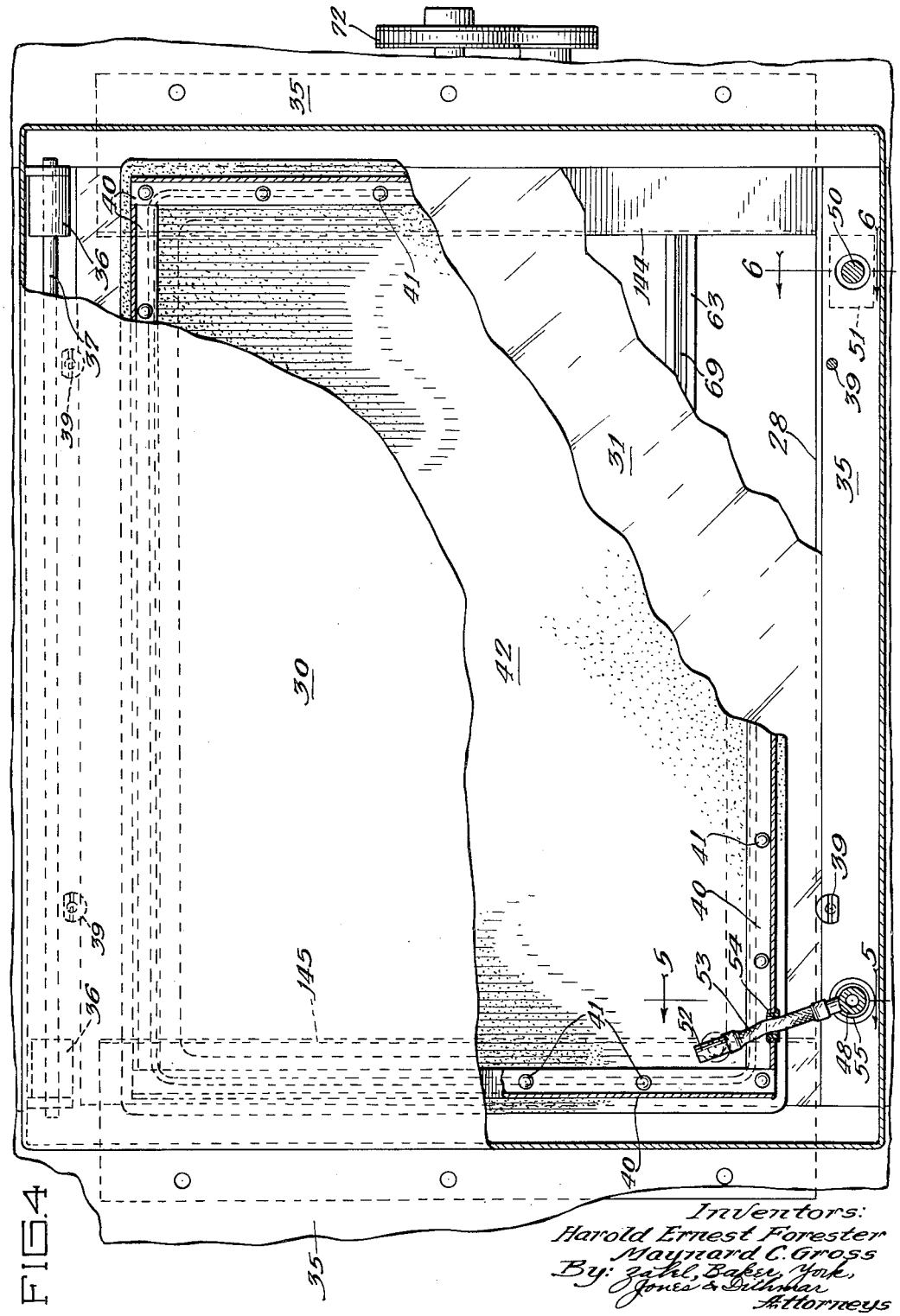

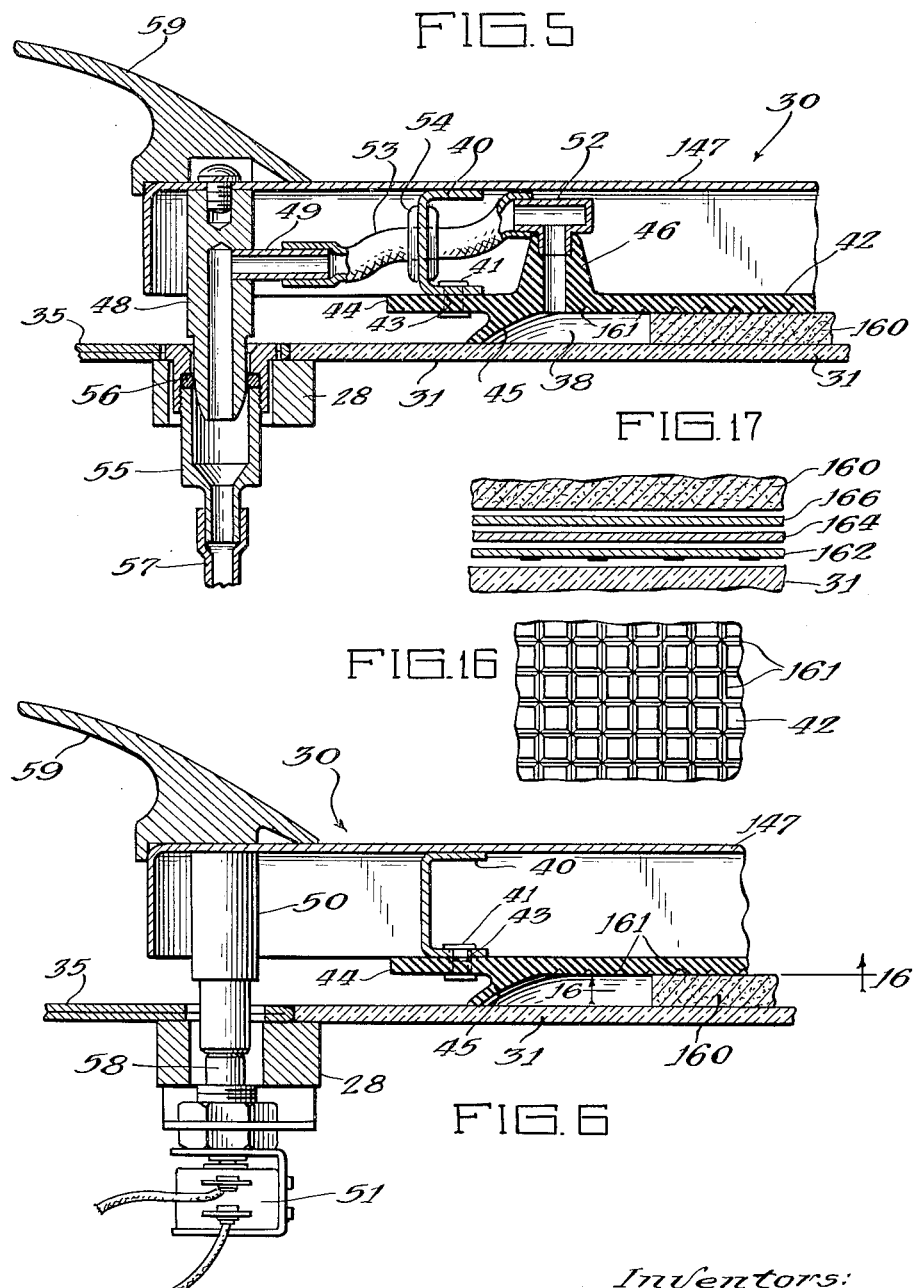

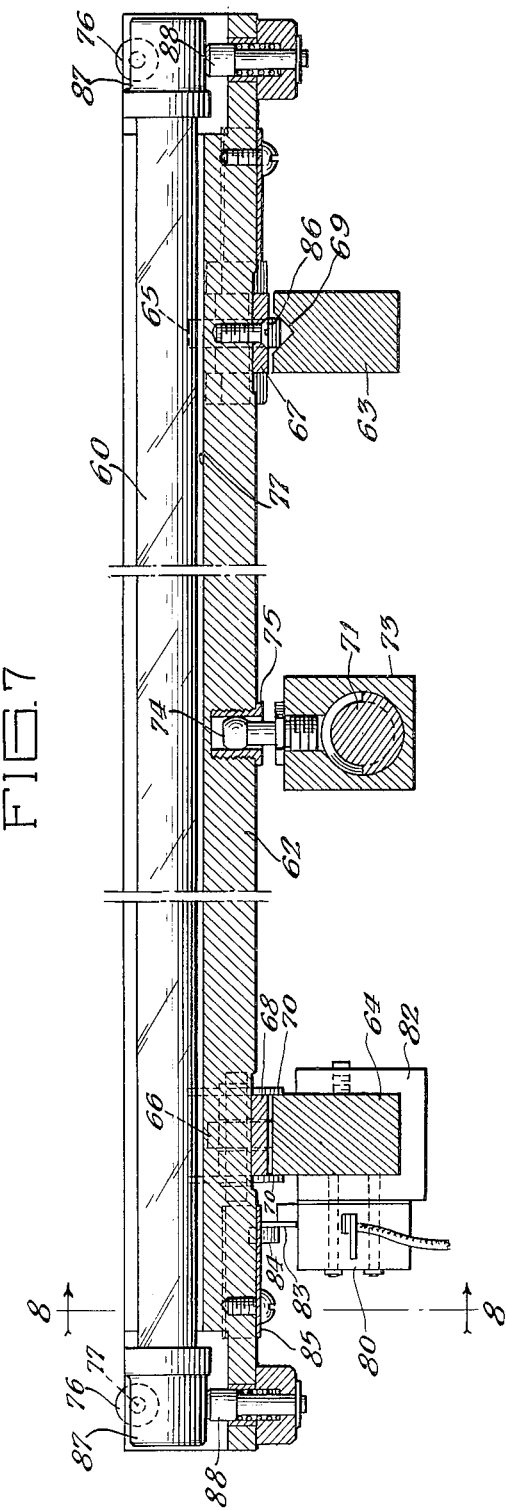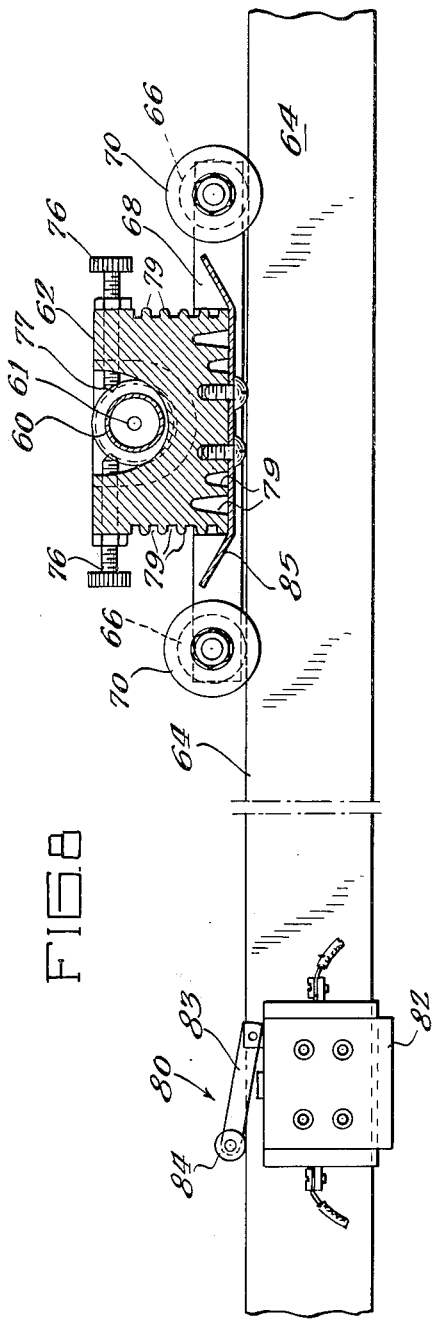

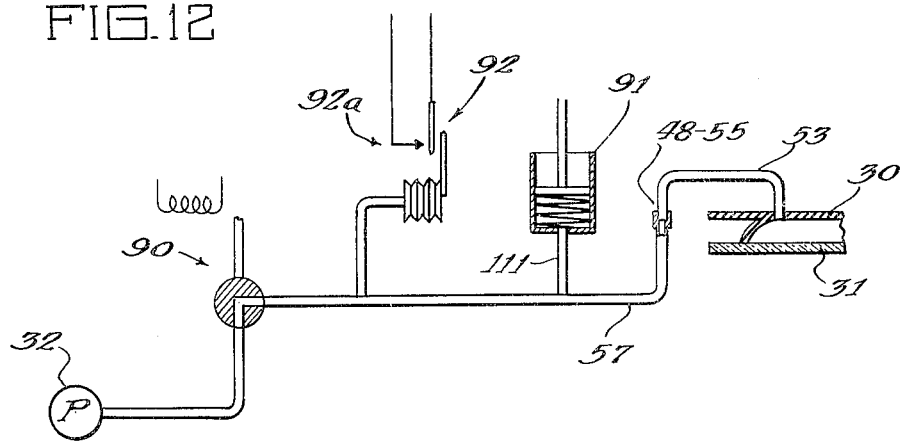
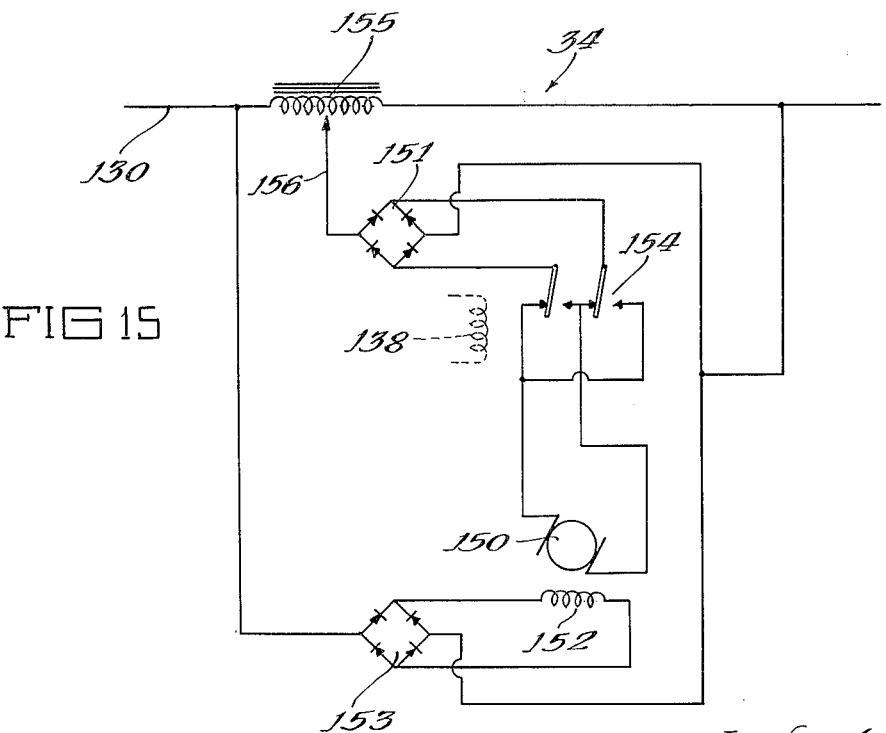

Inventors:
Harold Ernest Forester
Maynard C. Gross
By Zahl, Baker, York,
Jones & Orthner
Attorneys

United States Patent Office 3,007,390
Patented Nov. 7, 1961

3,007,390
EXPOSURE DEVICE
Harold Ernest Forester, Skokie, and Maynard C. Gross, Chicago, Ill., assignors to Ditto, Incorporated, Chicago, Ill., a corporation of Delaware
Filed May 22, 1959, Ser. No. 815,113
11 Claims. (Cl. 95—76)

This invention relates to an improved exposure device of the vacuum frame type, and in particular to improved means for controlling the operation thereof.

The term "vacuum frame" is commonly applied in the photographic and analogous arts to indicate a device for maintaining two or more sheets in intimate contact with each other for print making purposes. The vacuum frame proper is removably mounted for cooperation with a transparent sheet supporting base, and includes a flexible blanket and a supporting frame therefor. The components of a vacuum frame type of exposure device, in addition to the vacuum frame and the transparent base, include a vacuum pump for exhausting the air from the space between the blanket and the transparent base, and a radiant energy source which is located on the opposite side of the transparent base from the vacuum frame. In some instances, the radiant source is a traveling energy source with the result that driving means must be provided for the same.

An object of the present invention is to provide a vacuum frame type of exposure device in which the operation of the various components is controlled solely by movement of the vacuum frame into its operating position, without requiring the use of additional manually controlled operating means, thus providing completely automatic operation.

The invention is described herewith with respect to a thermal transfer type of exposure device, although the invention, in certain of its aspects, is equally applicable to other types of exposure devices, such as photographic and non-transfer type thermal devices.

Another object of this invention is to provide a vacuum frame type of exposure device having an improved traveling energy source which is mounted so as to maintain its focus in all positions, and which is characterized by a uniform rate of traverse thus providing uniform exposure.

The thermal transfer type of device herein described is provided with two separate motors, one for the vacuum pump, and one for driving the traveling energy source, and is also provided with means for energizing and deenergizing both the radiant energy source and the motors.

Another object of the present invention is to provide control means whereby the traveling radiant energy source together with the driving means therefor are initially energized by means responsive to the degree of vacuum built up in the vacuum frame, thus providing an automatic control in which the exposure operation cannot be initiated until such time as the superimposed sheets are brought into that intimate type of contact which is required for the production of a finely delineated image. Since, according to the thermal transfer process, the requirements for intimate contact of the superimposed sheets are somewhat greater than for other copy making processes, this aspect of the invention is of particular applicability to the thermal transfer type of process.

A further object is to provide a device of the type described in which the vacuum developed in the vacuum frame is utilized to maintain the vacuum frame and base in a locked position during the exposure operation.

Still another object is to provide a machine in which the vacuum is automatically released at the conclusion of the exposure operation.

A still further object is to provide improved control means whereby the cycle is initiated by closing the vacuum frame and the vacuum is utilized to prevent inadvertent interruption of the cycle, and in which the control means is conditioned for a subsequent cycle by the opening of the vacuum frame.

Other features of the invention are to provide a mechanism in which both the forward and return movements of the traveling energy source are utilized for exposure operations, to provide a safety interlock to prevent burning of the sheets and damage to the mechanism in the event of motor failure, to provide for preheating of the energy source to obtain uniform density of copy, and to prevent re-cycling due to otherthrow of the driving means and premature operation of the various control relays.

Other objects, features and advantages of the invention will become apparent as the description proceeds.

With reference now to the drawings in which like reference numerals designate like parts:

FIG. 1 is a transverse sectional elevation along line 1—1 of FIG. 3 showing a preferred embodiment of this invention;

FIG. 2 is a right side elevation of the device shown in FIG. 1;

FIG. 3 is a plan section taken along line 3—3 of FIG. 1;

FIG. 4 is a plan view partially in section showing the cover;

FIG. 5 is a section along line 5—5 of FIG. 4 showing the coupling in the vacuum line;

FIG. 6 is a section along line 6—6 of FIG. 4 showing the cover switch;

FIG. 7 is a longitudinal setcion along 7—7 of FIG. 3 showing the energy source and the mounting therefore;

FIG. 8 is a transverse section along line 8—8 of FIG. 7;

FIG. 9 is an end elevation partially in section, taken along line 9—9 of FIG. 1 and showing the vacuum brake;

FIG. 10 is a detail taken along line 10—10 of FIG. 3;

FIG. 11 is a plan section taken along line 11—11 of FIG. 9;

FIG. 12 is a diagram showing the vacuum system;

FIG. 15 is a detailed electrical diagram showing the variable speed reversing motor;

FIG. 16 is a fragmentary bottom view of the blanket showing the grooves therein;

FIG. 17 is an enlarged view showing the relationship of the superimposed sheets to each other and to the adjacent parts;

FIG. 18 is an elevation of a baffle; and

FIG. 19 is a plan view thereof.

General organization

Figure 14:
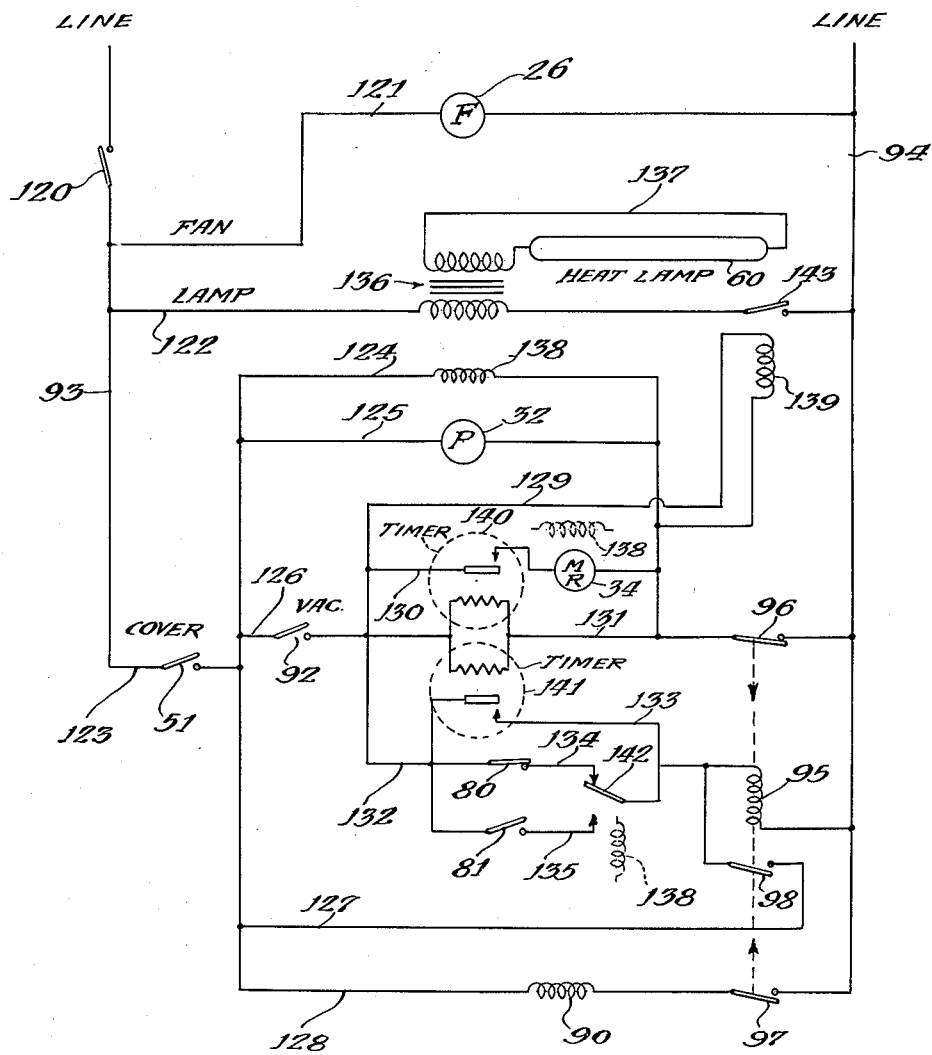
FIG. 14 is a wiring diagram.

The frame work of the device as shown in FIGS. 1, 2 and 3 comprises a base 20 and right and left end members 21 and 22. The framework is intended to be included in a housing which is not shown except for a decorative front grill member 23 which may be suitably secured to the end members. Mounted over a suitable opening in the base 20 is a fan housing 24 which includes a fan 25 and a fan motor 26 and which supports a baffle 27. Connecting the upper edges of the end members 21 and 22 are front and rear support bars 28 and 29.

The principal elements of the device comprise a hingedly mounted vacuum frame 30 providing a cover below which is disposed transparent sheet supporting base 31, such as a glass plate. Supported by the framework are an electrically operated vacuum pump 32, a traveling radiant energy source 33, and a drive motor 34, as shown in FIG. 3.

The front and rear edges of the glass plate 31 rest on the support bars 28 and 29, and may be removably secured thereto by suitable clips, not shown. Filler strips 35 also overlie the support bars and abut the glass plate 31 so as to provide a flush working surface, the filler strips also extending along the side edges of the glass plate and forming a continuation of the housing. Lugs 36, as shown in FIGS. 2 and 4 project upwardly from bar 29 and extend through the back filler strip and provide means on which the vacuum frame may be hingedly mounted by a pin 37.

*The vacuum frame*

The construction of the vacuum frame is shown in FIGS. 4, 5 and 6, and comprises a rectangular frame member 40 comprised of U-shaped strips. A series of headed pins or buttons 41 depend from the lower surface of the frame and a resilient blanket 42, having correspondingly located holes 43 is mounted on the pins 41. The holes 43 are spaced inwardly from the marginal portions 44 to facilitate manipulation of the blanket 42 incident to installation. The blanket 42 which is preferably formed of rubber or a similar material, in its relaxed form is considerably smaller than the rectangular frame 40. Thus, when mounted, the blanket is under substantial tension. The button and hole arrangement provide a convenient mounting means for the blanket, and the arrangement is such as to eliminate the usual retaining strips.

Disposed just inwardly from the series of holes 43 and extending around all four sides of the blanket is a continuous lip 45 which is adapted to engage the glass plate 31 to provide a vacuum seal, the lip extending outwardly and downwardly as shown in FIG. 5. A nipple 46 is formed in the blanket at a point adjacent the lip 45.

The frame 40 and blanket 42 are mounted within an enclosure 47 which is provided with a handle 59 at its front edge so that the vacuum frame can be raised and lowered.

The front edge of the enclosure is provided with two downwardly extending pins, the lower ends of which are received within the front support bar 28. The first of these pins constitutes a male coupling member 48 which as shown in FIG. 5 is drilled to provide a passageway which communicates with a short laterally extending pipe 49. The other pin constitutes an actuating pin 50 for engaging the plunger 58 of a cover switch 51 which is secured to the underside of the front support bar 28.

As shown in FIGS. 4 and 5, a suitable union 52 feeds into the nipple 46, and a flexible tube 53 connects the union 52 with the coupling member 48. The tube 53 passes through the web of the frame member 40 and is protected therefrom by a suitable grommet 54.

The other half of the coupling comprises a socket 55 which is mounted in the support bar 28 and which is provided with an O ring seal 56, thus making an air tight connection with the socket 55 when the vacuum frame 30 is lowered into its operative position. A tube which constitutes the vacuum line 57 connects the socket 55 with the vacuum pump 32, as shown in FIG. 12.

In operation, after the superimposed sheets have been placed on the glass plate 31, the vacuum frame 30 is lowered into its operative position as shown in FIGS. 4, 5 and 6, the lip 45 forming a seal for the space 38 which is enclosed by the blanket 42 and the glass plate 31. The closing of the cover switch 51 starts the vacuum pump 32, and the vacuum created within the space 38 effectively locks the parts together until the vacuum is automatically released by means hereinafter described.

*Effecting sheet contact*

As shown in FIG. 17, the original 162, having printed or typed characters 163, is laid face down on the glass plate 31. Then a transfer sheet 164 having a suitable coating 165, is laid, coating side up, over the original, and the copy sheet 166 is placed on the transfer sheet. The relationship may be reversed to make reflex prints, and the transfer sheet may be omitted in making other types of thermal prints or in making photographic prints.

The blanket 42 is mounted under tension so that contact with the superimposed sheets is made first at the center of the vacuum frame, and then moves progressively outwardly with an ironing effect so as to eliminate the formation of bubbles and wrinkles. However, due to slight variations in the resilience or thickness of the blanket from point to point there is still a possibility that the contact will not be progressive with the result that entrapped areas may be formed which tend to be self sealing, thus forming bubbles and wrinkles which not only interfere with the intimate contact required in all types of analogous printing operations, but which also provide heat reflecting surfaces which are disposed at an angle to each other in such a manner that streaking due to uneven heating or to localized overheating may result in the case of the thermal transfer process.

Therefore it is preferred to provide the blanket 42 with a series of intersecting grooves 161 is shown in FIG. 16 to prevent the formation of self sealing entrapped areas. In order to avoid the consequent inequality of contact pressure, a porous cushion 160 as shown in FIGS. 5 and 6 is secured to the blanket 42 or otherwise interposed between the blanket and the superimposed sheets. The porous cushion 160 is preferably in the form of soft paper stock similar to blotter stock and serves to equalize the contact pressure. Being porous, the cushion avoids the formation of the self sealing entrapped areas. Nevertheless the cushion, being at least slightly compressible, does not interfere with progressive contact, or ironing effect, provided by the tensioning of the blanket 42.

In other types of processes, the grooves 161 and the cushion 160 may be omitted as shown in FIGS. 1, 2 and 4.

*The traveling energy source*

A suitable source of radiant energy is provided which in the embodiment shown comprises a heat lamp 60 which is located beneath the glass plate 31. The heat lamp is provided with a linear filament 61 thus providing a linear energy source which is focused on the characters of the original 162. The exposure operation is effected by causing the energy source to travel between two terminal positions located at opposite ends of the glass plate to the other, and control of exposure is effected by regulating the rate of traverse. According to the present invention, therefore, the driving mechanism for the traveling energy source serves as the timing means which controls the exposure.

Means shown in FIGS. 7 and 8 are provided for mounting the heat lamp 60 so that the filament 61 thereof will be maintained in a common plane throughout its travel to provide accurate focusing, and so that the rate of traverse will be uniform, thus providing for uniform exposure.

The heat lamp 60 is mounted in a carriage 62 which travels on transversely disposed front and rear rails 63 and 64, the latter being supported by the end members 21 and 22. The carriage 62 is supported by means of front and rear trucks 67 and 68, each of which are provided with wheels 65 and 66 respectively which ride on the rails 63 and 64.

In order to maintain the carriage perpendicular to the line of travel, it is secured at one end to the front truck 67, and the front truck, in turn, is designed to maintain parallelism with the front rail 63 to a high degree of accuracy, this being accomplished by means of a V-shaped groove 69 in which the front wheels 65 ride as shown in FIG. 7. The front truck 67 is secured to the carriage by one or more screws 86. It will be observed that the lower surface of the truck clears the upper surface of the rail 63, the screw 86 also serving to adjust the clearance so that positive contact with the rail is made only by the corner edges of the front wheels 65.

The carriage 62 at its rear end is not secured to the rear truck 68 but merely rests thereon so as to permit the small amount of sliding motion which is necessary to accommodate thermal expansion of the carriage. In order to maintain the rear truck 68 in position with the rear rail 63, the wheels 66 may be provided with end flanges 70, the groove arrangement not being necessary because exact alinement is not required with respect to the rear truck. Thus, binding and cocking, due to thermal expansion of the carriage 62, is eliminated, and uniform rate of traverse is obtained. Uniformity is also obtained by the use of a screw type driving means which provides positive driving action and a smoothness of motion not found in belt and chain drives.

A drive screw 71 is journaled in end members 21 and 22 and is driven from the motor 34 by means of a belt and pulley arrangement 72. A nut 73 mounted on the screw, as shown in FIG. 7 and projecting from the upper surface thereof is a ball pin 74 which is received within a hardened bushing 75 located in the lower surface of the carriage 62. Thus the carriage is moved transversely by rotation of the drive screw 71, and the ball pin and bushing arrangement 74—75 permit a limited amount of movement of the carriage in the forward and back direction to accommodate thermal expansion of the carriage.

The heat lamp 60 is mounted in the carriage by means of pointed screws 76 which engage the terminal caps 87 of the heat lamp. The carriage is provided with a reflector surface 62, which serves to focus the rays of the linear filament at a focal plane immediately above the upper surface of the glass plate 31, in which focal plane the characters of the original are disposed. The reflector surface may be elliptical shaped with the linear filament 61 at one focus thereof, and the focal plane at the other focus of the ellipse. Resiliently mounted plungers 88 are provided in the carriage beneath the terminal caps 87 of the heat lamp 60 to urge the same upwardly against the tapered surfaces of the pointed screws 76. Thus, the pointed screws 76 provide a means for bringing the filament 61 into proper focus.

The carriage 62 may preferably be formed of an extrusion of aluminum or other metal of high heat conductivity, and the side and bottom surface thereof may be grooved to provide heat radiating fins 79, as shown in FIGS. 1 and 8. The front and rear rails 63 and 64 are of substantial cross section with regard to the weight of the carriage 62 so as to minimize any beam deflection. Thus, a construction is provided in which the filament 61 of the heat lamp is maintained in a plane. Furthermore, the carriage is mounted to accommodate thermal expansion, thus avoiding stresses which would tend to bind on the rollers or otherwise vary the friction of movement in a manner which would detract from a uniform rate of traverse.

The limit switches

A pair of limit switches 80 and 81 are mounted by means of brackets 82 on the rear rail 64, as shown in FIGS. 3, 7 and 8. Each limit switch is provided with an actuating lever 83 which terminates in a roller 84. The actuating levers preferably are pivoted at their inner ends, with respect to the medial plane of the machine, and are depressed by a shoe 85 which is carried on the lower surface of the carriage 62, the cam surface of the shoe engaging one or the other of the rollers 84. As will hereinafter be described, actuation of either limit switch causes de-energizing of both the heat lamp 60 and the drive motor 34 and thus terminates the exposure period.

The vacuum system

The elements included in the vacuum system, as shown in FIG. 12, include, in addition to the vacuum pump 32 and the vacuum frame 30, a two-way valve 90, a vacuum actuated brake 91, and a pressure responsive switch 92. The relationship of these elements is shown in FIG. 12. After the pump 32 has been energized, and after a predetermined degree of vacuum has been built up, the pressure responsive switch 92 closes, and initiates the exposure operation. At the conclusion of the exposure operation, the vacuum release solenoid valve 90 is energized to release the vacuum thus permitting the cover to be opened. The vacuum brake 91 is actuated when the vacuum is released to prevent overthrow of the carriage 62 beyond the limit switches 80 and 81, as will be hereinafter pointed out.

Figure 13:
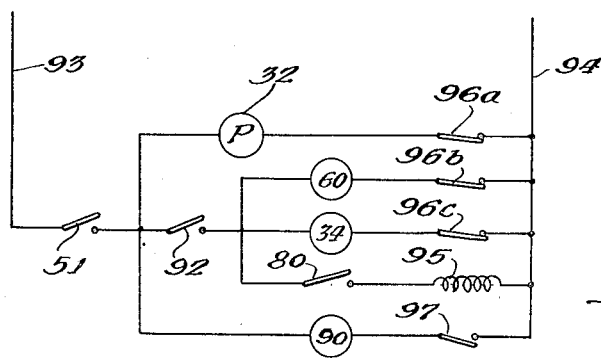
FIG. 13 is a diagram showing the electrical relationship of principal elements of the device.

The relationship of the foregoing elements to the cover switch 51 is diagrammatically illustrated in FIG. 13. As shown therein, the closing of the cover switch 51 energizes the vacuum pump 32 and conditions the branch circuits which include the pressure responsive switch 92 and the vacuum release solenoid valve 90.

Operation of the pressure responsive switch 92 energizes the heat lamp 60 and the motor 34 for driving the same, and conditions the limit switch 80.

Operation of the limit switch 80 energizes a relay 95 which opens contacts 96a, 96b, and 96c to de-energize the circuits including the vacuum pump 32, the heat lamp 60, and the motor 34. The relay 95 also closes contact 97 to energize the circuit including the vacuum release solenoid valve, thus releasing the vacuum to permit the opening of the vacuum frame 30. The opening of the vacuum frame opens the cover switch 51 and de-energizes all circuits.

The vacuum brake

The overall width of the machine is reduced by providing brake means for counteracting the inertia of the rotating parts after the motor 34 has been de-energized. In other words, the brake means prevents physical overthrow of the carriage 62 beyond the limit switches 80 and 81. The brake means provided is shown in FIGS. 1, 3, 9 and 11. The left end of the lead screw 71 is provided with a disk 100 made of a suitable friction material. Beneath the disk is located vacuum brake 91 which carries a brake shoe 101 in the form of a disk having a spherical upper surface 102.

The vacuum brake comprises a cylinder 103 and piston 104 the upper end of which terminates in a flange 105. The piston is slidably mounted in a vented closure 106 for the upper end of the cylinder 103. An actuating spring 107 is confined between the flange 105 and the closure 106.

A stem 108 is slidably mounted in a bore 112 found in the upper end of the piston, the shoe 101 being carried thereby. A loading spring 109 surrounds the stem and is confined by the shoe and the piston flange 105 and tends to urge the brake shoe into contact with the disk 100 at all times to impose a drag on the drive mechanism. The shoe 101 and stem 108 are free to rotate about a vertical axis so that the spherical surface 102 will be maintained, the edge 113 of the disk tending to conform itself to surface 102 to provide maximum contact area.

The lower end of the cylinder 103 terminates in a fitting 110 to which a tube 111 is connected, the tube 111 communicating with the vacuum line 57 as shown in FIG. 12.

In operation, when the vacuum is established, the piston 104 will be displaced downwardly against the bias of the actuating spring 107, thus maintaining the brake inoperative. Upon release of the vacuum, the actuating spring 107 urges the brake shoe 101 upwardly into engagement with the disk 100, causing the drive screw 62 and the driving mechanism to come to a smooth stop, the force being transmitted from the piston to the brake shoe by the abutting engagement of the bottom of bore 112 with the bottom of the stem 108. However even when the parts are in the retracted position as shown in FIG. 9, the brake shoe 101 maintains a slight drag on the driving mechanism by virtue of the loading spring 109. This drag serves to mask minor variations in the load which might affect the uniformity of the rate of traverse of the carriage, hence promoting uniform exposure. Such variations may be caused by the effect of temperature on bearings, lubricant, and belt flexibility.

*The control circuit*

The control circuit is diagrammatically illustrated in FIG. 14, the general operation of which has been outlined in connection with the description of FIG. 13. Reference numerals 93 and 94 designate the line conductors, and a main switch 120 is interposed in conductor 93 to turn the device off and on.

There are three main circuits connected between conductors 93 and 94 and in parallel with each other, the fan circuit 121 which includes the fan motor 26, the lamp power circuit 122 which includes the primary of a transformer 136, and an operating circuit 123 which includes the cover switch 51 and five branch circuits which are connected in parallel to each other and in series with the cover switch 51.

The five branches of the operating circuit 123 are the reversing relay circuit 124 which includes a reversing relay 138, the vacuum pump circuit 125 which includes the electrically operated vacuum pump 32, a control circuit 126 which includes the pressure responsive switch 92 and four branch circuits controlled thereby, a holding circuit 127 for the relay 95, and a vacuum release circuit 128 which includes the vacuum release solenoid valve 90.

The four branches of the control circuit 126 comprise a lamp control circuit 129 which includes lamp relay 139, a motor circuit 130 which includes the drive motor 34, a heater circuit 131 for the filaments of timers 140 and 141, and a relay circuit 132 which includes the relay coil 95 for actuating the normally closed contacts 96 and the normally open contacts 97 and 98.

The relay circuit 132 includes three branches which are connected in parallel to each other and in series with the relay 95, these being a timer circuit 133 which includes a thermal make timer 141, a first limit switch circuit 134 which includes limit switch 80 and a second limit switch circuit 135 which includes limit switch 81. The limit switch circuits 134 and 135 are alternately conditioned by a double throw switch 142 which is connected in series with the relay 95 and which is automatically actuated for alternate operation by the reversing relay 138.

The closing of the main switch 120 energizes the fan motor 26 and conditions the lamp power circuit 122 and the operating circuit 123. The lamp power circuit also includes normally open relay contacts 143 which are closed by the energization of the lamp control relay 139. This energizes the transformer 136 which supplies electrical energy to the heat lamp 60 which is connected into the secondary circuit 137 of the transformer 136.

Closing the vacuum frame 30 operates the cover switch 51 to energize circuits 124 and 125, thus operating the reversing relay 138 and starting the vacuum pump 32, and it conditions the circuits 126, 127 and 128 for subsequent operation.

Assuming that the carriage 62 is in its extreme right hand position as viewed in FIG. 3, in which the limit switch 80 is closed, as shown in FIG. 14, and in which the reversing motor is still conditioned for return movement, operation of the reversing relay 138 will move the double throw switch 142 into contact with the second limit switch circuit 135, thereby de-conditioning the first limit switch circuit 134 and it will also condition the reversing motor 34 for forward drive.

As soon as a predetermined degree of vacuum has been reached, such as the 23 inches of mercury at which the machine is designed to operate, the pressure responsive switch 92 will close thereby operating the lamp relay 139 to energize the heat lamp 60, and energize the motor 34 which is now conditioned for operation in the forward direction, from right to left as viewed in FIG. 3. This starts the exposure operation. However, it is preferred to delay the operation of the motor for a short period such as from two to four seconds in order to permit the heat lamp 60 to be brought up to full operating temperature, thus providing for uniform density of exposure. Therefore, a delay timer (thermal make) 140 is connected in the motor circuit 130 in series with the reversing motor 34.

In this connection heat baffles 144 and 145, formed of polished aluminum or the like, are located beneath the right and left hand edges of the glass plate 31, as shown in FIGS. 1 and 4. During this pre-heat period, the heat lamp 60 is located beneath one or the other of these heat baffles so as to avoid scorching of the rubber blanket 42 and so as to avoid the creation of a heat pattern which would expose the marginal portions of an extra long copy sheet.

Therefore, as soon as the pressure responsive switch 92 closes, the filaments of the delay timers 140 and 141 are energized at the same time that the heat lamp 60 is initially energized. After the required period of delay the motor circuit 130 through delay timer 140 is closed to energize the reversing motor 34 so that the carriage 62 will be driven in the forward direction, from right to left, and at a constant rate of speed.

The circuits 124, 125, 129, 130 and 131 are maintained by the normally closed relay contact 96.

As soon as the carriage starts its traverse, the limit switch 80 opens, but this does not affect the operation since the first limit switch circuit 134 had previously been opened by operation of the reversing relay 138, as pointed out above. Thus, by connecting the limit switches in series with the pressure responsive switch 92, the proper sequence of operation is obtained because the double throw switch 142 will always be operated prior to the conditioning of the relay circuit 132 by the closing of the pressure responsive switch 92.

When the carriage 62 arrives at its terminal position at the left end of the machine, the limit switch 81 will be operated to energize the operating relay 95 to open the relay contact 96, thereby de-energizing circuits 124, 125, 129, 130 and 131, with the result that the lamp 60 will be de-energized and the motor 34 will come to a stop. At the same time, the contacts 97 and 98 will be closed, the closing of the contact 97 serving to energize the vacuum release solenoid valve 90 to release the vacuum in the vacuum frame 30. This will cause operation of the vacuum brake 91 which facilitates the stopping of the motor as soon as the same is de-energized.

Similarly release of the vacuum will cause the opening of the vacuum switch 92 which in turn would de-energize the operating relay 95, and hence tend to cause re-cycling if the cover switch is not immediately opened, due to re-energization of the vacuum pump 32 and of the reversing relay as soon as the operating relay 95 is de-energized. Therefore, a holding circuit 127 is provided which is connected in parallel with the operating circuit 126 to maintain the operating relay 95 in its energized and operated position until such time as the vacuum frame 30 is opened.

Upon the opening of the vacuum frame 30 and the consequent opening of the cover switch 51, the relay 95 is de-energized with the result that all contacts and relays return to their normal position, and all circuits are conditioned for a subsequent operation.

In the event of motor failure or the occurrence of other conditions which would tend to delay the termination of the exposure period, the delay timer 141 (thermal make) will close and actuate the relay 95 to terminate the exposure operation before the parts can be damaged by excessive heat.

The fan circuit 121 is not controlled by the cover switch 51 because it is deemed advisable to maintain the fan motor energized between successive printing operations to maintain as low as possible the temperature of the glass plate 31 so as to avoid any overheating which would affect the printing quality.

Improved distribution of the air stream provided by the fan 26, and consequent improvement in uniformity of glass temperature, may be obtained by providing a conical baffle 146 having radially disposed vanes 147, as shown in FIGS. 18 and 19, above the fan 26. This may be mounted in the upper portion of the fan housing 24 and beneath the horizontal baffle 27. The vanes 147 tend to break up the whirling of the air stream.

*The drive motor*

As shown in FIG. 15, the drive motor 34 is a D.C. motor operating on rectified current supplied by the motor circuit 130. The motor comprises an armature 150 which is connected across the terminals of a full wave rectifier 151, and a shunt field 152 connected across the terminals of rectifier 153. A reversing switch 154 is provided in the armature circuit which is operated by the reversing relay 138 for reversing the polarity of the armature 150.

Variable speed, and hence exposure control, is obtained by regulating the voltage impressed upon the armature. This is accomplished by a variable output autotransformer 155 having a sliding tap 156. The sliding tap is mechanically connected to a suitable control knob not shown so that the motor speed, and hence the rate of traverse, may be regulated in accordance with the conditions encountered to provide a print of the required density.

As previously indicated successive operations of the reversing relay 138 condition the motor 34 for alternate operation in opposite directions on successive operating cycles.

*Operation*

The operation of the printing device has been described in detail in connection with the description of the various parts and said assemblances. To summarize the same, when it is desired to make a print or copy, the vacuum frame 30 is first raised, and the original and the copy and transfer sheets are placed on the glass plate 31 in the desired relationship.

After the sheets have been positioned, the vacuum frame 30 is lowered, thus connecting the vacuum frame to the pump 32 through the coupling 48—55, and also starting the pump.

After a suitable lamp preheating period, and assuming the carriage 62 to be at the right terminal position, the carriage moves from right to left thereby effecting exposure. Exposure control is effected by shifting the sliding tap 156 of the autotransformer 155 to control the rate of traverse. Uniform rate of traverse, which is one of the requirements of uniform copy density, is promoted by imposing a drag on the rotating parts by the spring loaded brake shoe 101 in order to minimize the effect of variations and friction and other mechanical operating conditions. Uniform intensity of energy source 33 is obtained by the preheating period.

At the conclusion of the exposure operation, the vacuum is released and the operator raises the vacuum frame 30 which conditions all circuits for a subsequent operating cycle by the opening of the cover switch 51. More specifically, this closes the vacuum release solenoid valve 90, and de-energizes the operating relay 95 and the reversing relay 138 so that the parts are all in the normal position shown in FIG. 14, with the exception that now the limit switch 81 is closed, and the limit switch 80 is opened, and the double throw contact 142 is in its opposite position.

Although only a preferred embodiment of this invention is shown and described herein, it will be obvious that various modifications and changes may be made in the construction shown without departing from the spirit of the invention as pointed out in the appended claims.

We claim:
1. A vacuum frame type of exposure device comprising a framework, a transparent sheet supporting base mounted on said framework, a vacuum frame removably mounted on said framework above said base, a vacuum pump connected to said vacuum frame, a radiant energy source for said exposure operation, means for slidably mounting said source beneath said transparent base for movement between two terminal positions, driving means for moving said energy source from one terminal position to the other along the length of said transparent base to effect exposure, and a cover switch actuated by the movement of said vacuum frame into operating position for energizing said vacuum pump, and for controlling the operation of said energy source and said driving means.

2. A vacuum frame type of exposure device comprising a framework, a transparent sheet supporting base mounted on said framework, a vacuum frame removably mounted on said framework above said base, a vacuum pump, a vacuum line providing communication between said vacuum frame and said vacuum pump, a cover switch actuated by movement of said vacuum frame into operating position for energizing said vacuum pump, a radiant energy source for said exposure operation mounted beneath said transparent base for movement between two terminal positions, driving means for moving said energy source from one terminal position to the other along the length of said transparent base to effect exposure, and a pressure responsive switch connected to said vacuum line and operable by the attainment of a predetermined degree of vacuum within said line, said driving means being energized by the operation of said pressure responsive switch.

3. A vacuum frame type of exposure device as claimed in claim 2 in which said energy source is also energized by the operation of said pressure responsive switch.

4. A vacuum frame type of printing device comprising a framework, a transparent sheet supporting base mounted on said framework, a vacuum frame removably mounted on said framework above said base, a vacuum pump, a vacuum line providing communication between said vacuum frame and said vacuum pump, a cover switch actuated by movement of said vacuum frame into operating position in contact with the transparent base for energizing said vacuum pump, the vacuum developed within said vacuum frame serving to lock said vacuum frame in its operative position during an exposure operation, a vacuum release valve connected to said vacuum line for releasing the vacuum within said vacuum frame to permit separation of said vacuum frame and said transparent base at the conclusion of an exposure operation, a radiant energy source for said exposure operation mounted beneath said transparent base for movement between two terminal positions, and relay means operated by the movement of said energy source into a terminal position to de-energize said energy source, thus terminating the exposure operation, the operation of said relay means also actuating said vacuum release valve to release the vacuum and to permit the opening of said vacuum frame.

5. A vacuum frame type of exposure device as claimed in claim 4 including means actuated by the separation of said vacuum frame from said transparent base for conditioning said relay means for a subsequent cycle of operation.

6. A vacuum frame type of exposure device comprising a framework, a transparent sheet supporting base mounted on said framework, a vacuum frame hingedly mounted on said framework above said base, a vacuum pump, a vacuum line providing communication between said vacuum frame and said vacuum pump, a cover switch actuated by the movement of said vacuum frame into operating position in contact with the transparent base for energizing said vacuum pump, a vacuum release valve connected to said vacuum line for releasing the vacuum within said vacuum frame to permit separation of said vacuum frame and said transparent base at the conclusion of an exposure operation, a radiant energy source for said exposure operation, means for slidably mounting said source beneath said transparent base for movement between two terminal positions, driving means for moving said energy source from one terminal position to the other along the length of said transparent base to effect exposure, a pressure responsive switch connected to said vacuum line and operable by the attainment of a predetermined degree of vacuum within said line, said energy source and said driving means being energized by the operation of said pressure responsive switch, and relay means operated by the movement of said energy source into a terminal position to de-energize said energy source and said driving means, thus terminating the exposure operation, the operation of said relay means also actuating said vacuum release valve to release the vacuum and to permit the opening of said vacuum frame.

7. An exposure device comprising a transparent sheet supporting base, a vacuum frame removably disposed above said base, a traveling energy source located beneath said base and movable between two terminal positions, driving means for driving said energy source from one of said terminal positions to the other for effecting exposure of one of a plurality of superimposed sheets supported by said base, means responsive to the development of a predetermined degree of vacuum in said vacuum frame for energizing both said energy source and said driving means, time delay means associated with said drive means to delay energization thereof subsequent to the operation of said pressure responsive means in order to provide a preheat period for said energy source, and reflecting means disposed above said energy source when located in one of said terminal positions to prevent the radiation from said energy source from affecting said superimposed sheets during said preheat period.

8. A vacuum frame type of exposure device comprising a framework, a transparent sheet supporting base mounted on said framework, a vacuum frame supported by said framework above the base and movable into and out of operative position with the transparent sheet supporting base, a radiant energy source located beneath said base, a carriage supporting said radiant energy source and mounting the same for movement between spaced terminal positions, means including a drive screw engaging said carriage for driving the carriage between said terminal positions, rail means supporting the carriage for movement, said rail means being mounted beneath the base and parallel thereto for maintaining the energy source and carriage equidistantly spaced from the base throughout its movement, a vacuum pump for producing a vacuum within the frame upon operation of the pump, switch means actuated by movement of the vacuum frame into operative position for energizing said vacuum pump, means responsive to the development of a predetermined degree of vacuum within the frame for energizing said radiant energy source and said driving means, and electric control means actuated by movement of said travelling energy source into a terminal position for releasing the vacuum within the vacuum frame and for de-energizing the said radiant energy source and said driving means.

9. A vacuum frame type of exposure device as defined by claim 8, wherein said driving means includes a reversing motor and wherein said control means includes an operating relay, a pair of limit switches for controlling the operation of the driving means and also the relay, said limit switches being disposed at opposite ends of the path of travel of said energy source whereby engagement of either one by said energy source will cause actuation of said operating relay, and a reversing relay actuated upon each exposure operation to reverse the direction of drive of said reversing motor so that both directions of movement of said light source will be utilized for exposure in successive printing operations.

10. In a vacuum frame type of exposure device, the combination including a vacuum frame movable into and out of an operative position, a source of radiant energy mounted for reciprocating movement with respect to the frame between two terminal positions, driving means for effecting movement of the radiant energy source, a vacuum pump for producing a vacuum within the frame upon operation of the pump, pressure responsive means for energizing the radiant energy source and the driving means when a predetermined vacuum exists in the vacuum frame, electric control means actuated by the movement of said radiant energy source into a terminal position for releasing the vacuum within the vacuum frame and for de-energizing the radiant energy source and the said driving means, said control means including an operating relay conditioned for operation by said pressure responsive means, switch means actuated by movement of said vacuum frame into an operative position for energizing the vacuum pump, and a holding circuit for said operating relay and which is shunted around said pressure responsive means and connected in series circuit with said switch means, whereby said relay will remain energized after operation of said pressure responsive means into a non-energizing position due to the release of said vacuum, thereby preventing recycling due to an energizing operation of said pressure responsive means prior to the time that said vacuum pump is de-energized by the movement of said vacuum frame out of its operative position.

11. A vacuum frame type of exposure device comprising a framework, a transparent sheet supporting base mounted on said framework, a vacuum frame mounted on the framework above the base and adapted to move into and out of operative relation with the base, a vacuum pump, a vacuum line providing communication between said vacuum frame and vacuum pump, a cover switch actuated by movement of the vacuum frame into an operative position for effecting operation of the vacuum pump, a radiant energy source adapted to have movement below the sheet supporting base and between spaced terminal positions, a pressure responsive switch connected to said vacuum line and operable into an energizing position when a predetermined degree of vacuum exists within the line, said pressure responsive switch when in its energizing position effecting energization of the radiant energy source, an electrical control circuit including limit switches actuated by movement of the radiant energy source into either one of its terminal positions for effecting release of the vacuum within the frame and for de-energizing the radiant energy source, and a time-thermo switch in the control circuit in series relation with the pressure responsive switch, whereby a pre-determined delay in the movement of said travelling energy source into a terminal position will render the time-thermo switch operative to effect release of the vacuum and de-energization of the radiant energy source.

References Cited in the file of this patent

UNITED STATES PATENTS

| | | |
|---|---|---|
| 2,203,783 | Hineline | June 11, 1940 |
| 2,427,923 | Reynolds | Sept. 23, 1947 |
| 2,739,516 | Hosterman | Mar. 27, 1956 |
| 2,826,976 | Gelb | Mar. 18, 1958 |
| 2,869,447 | Youngberg | Jan. 20, 1959 |